US006983313B1

(12) United States Patent
Korkea-Aho

(10) Patent No.: US 6,983,313 B1
(45) Date of Patent: Jan. 3, 2006

(54) COLLABORATIVE LOCATION SERVER/SYSTEM

(75) Inventor: Mari Korkea-Aho, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/329,321

(22) Filed: Jun. 10, 1999

(51) Int. Cl.
*G06F 15/16* (2006.01)

(52) U.S. Cl. ...................................... 709/219; 709/229

(58) Field of Classification Search ................ 709/217, 709/218, 219, 203, 229; 701/208; 707/10, 707/513; 345/733, 744; 715/733, 744
See application file for complete search history.

(56) References Cited

U.S. PATENT DOCUMENTS

| | | | | |
|---|---|---|---|---|
| 5,555,376 | A | * | 9/1996 | Theimer et al. ............. 709/229 |
| 5,682,525 | A | * | 10/1997 | Bouve et al. ................ 709/217 |
| 5,737,533 | A | * | 4/1998 | DeHond et al. ............. 709/219 |
| 5,848,373 | A | * | 12/1998 | DeLorme et al. ........... 701/208 |
| 5,852,810 | A | * | 12/1998 | Sotiroff et al. ................ 707/10 |
| 5,930,474 | A | * | 7/1999 | Dunworth et al. .......... 709/217 |
| 5,944,769 | A | * | 8/1999 | Musk et al. ................. 709/217 |
| 6,107,961 | A | * | 8/2000 | Takagi ........................ 701/208 |
| 6,148,261 | A | * | 11/2000 | Obradovich et al. ........ 701/208 |
| 6,240,360 | B1 | * | 5/2001 | Phelan ........................ 701/208 |
| 6,243,094 | B1 | * | 6/2001 | Sklar .......................... 345/853 |
| 6,263,343 | B1 | * | 7/2001 | Hirono ........................ 707/104 |
| 6,317,718 | B1 | * | 11/2001 | Fano ............................... 705/1 |
| 6,336,074 | B1 | * | 1/2002 | Woo ............................ 701/208 |
| 6,381,603 | B1 | * | 4/2002 | Chan et al. ................... 707/10 |

FOREIGN PATENT DOCUMENTS

EP 1039265 9/2000
WO 9707467 2/1997

OTHER PUBLICATIONS

Clementini et al., "Browsing in geographic databases: An object-oriented approach", Oct. 1990, Proceedings of the 1990 IEEE Workshop on Visual Languages, ISBN 0-8186-2090-0, pp. 125-131.*
Shin et al., "IGWeL: Interactive and geographical web site locator", 1998, ACM 36th annual Southeast Regional Conference Proceedings, ISBN 1-58113-030-9, pp. 149-157.*
Yamada et al., "Map-based information mediation on the web with float coordinate system", Oct. 1999, IEEE International Conference on Systems, Man, and Cybernetics, IEEE SMC '99 Conference Proceedings, vol. 4, ISBN 0-7903-5731-0, pp. 93-98.*
M. Potmesil, Maps alive: Viewing Geospatial Information on the WWW, Computer Networks and ISDN Systems 29, (1997), pp. 1327-1342.

* cited by examiner

*Primary Examiner*—Marc D. Thompson
(74) *Attorney, Agent, or Firm*—Antonelli, Terry, Stout & Kraus, LLP

(57) ABSTRACT

A collaborative location server for storing, retrieving and publishing location information with respect to a geographical point. The invention includes a storage which stores location information in corresponding relation to each of a plurality of geographical points. The location information provides information concerning the geographical points. The invention further includes storage and retrieval apparatus, responsive to a storage and retrieval request including positioning information, for storing and retrieving location information concerning a geographical point corresponding to the positioning information.

32 Claims, 12 Drawing Sheets

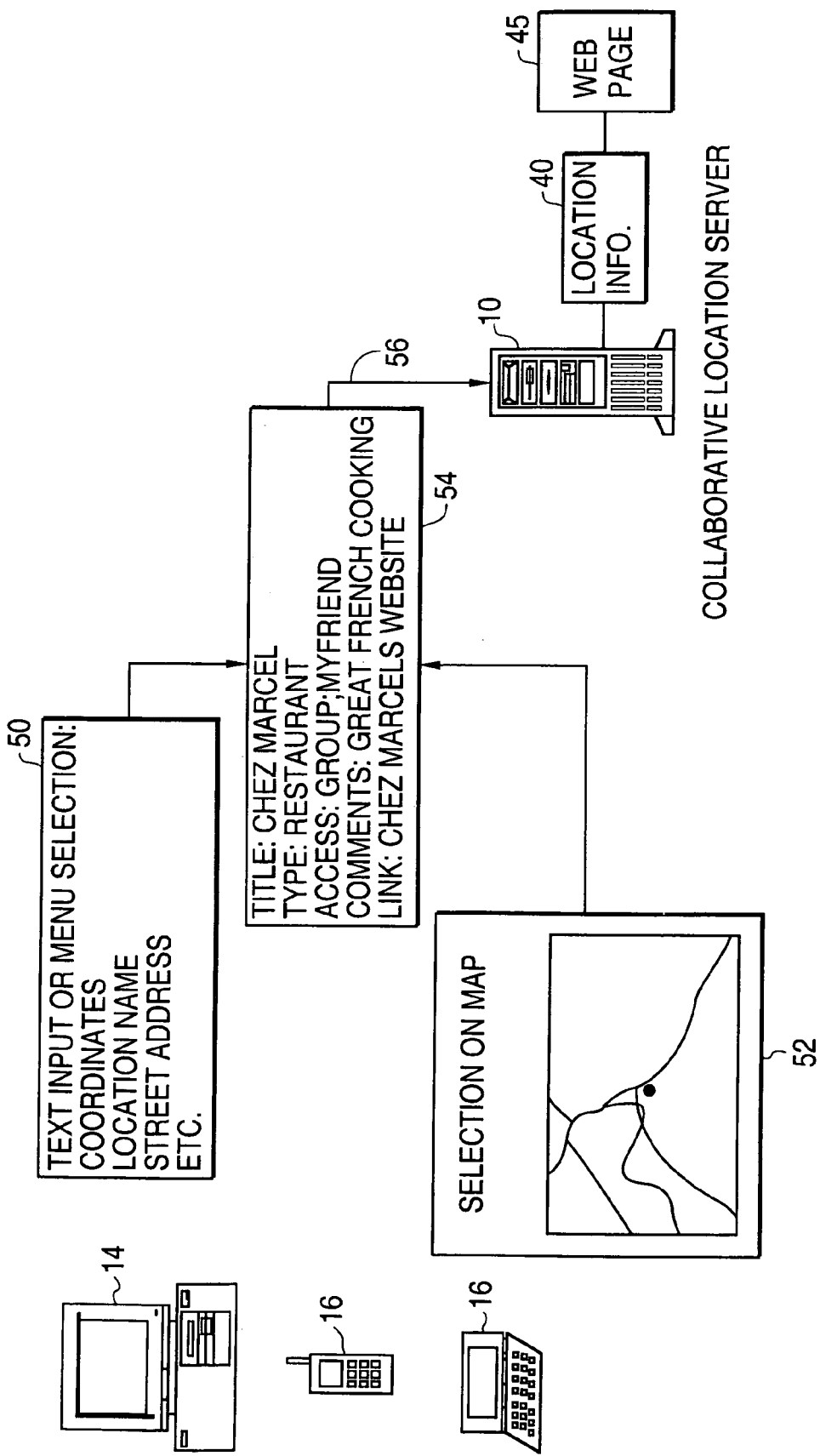

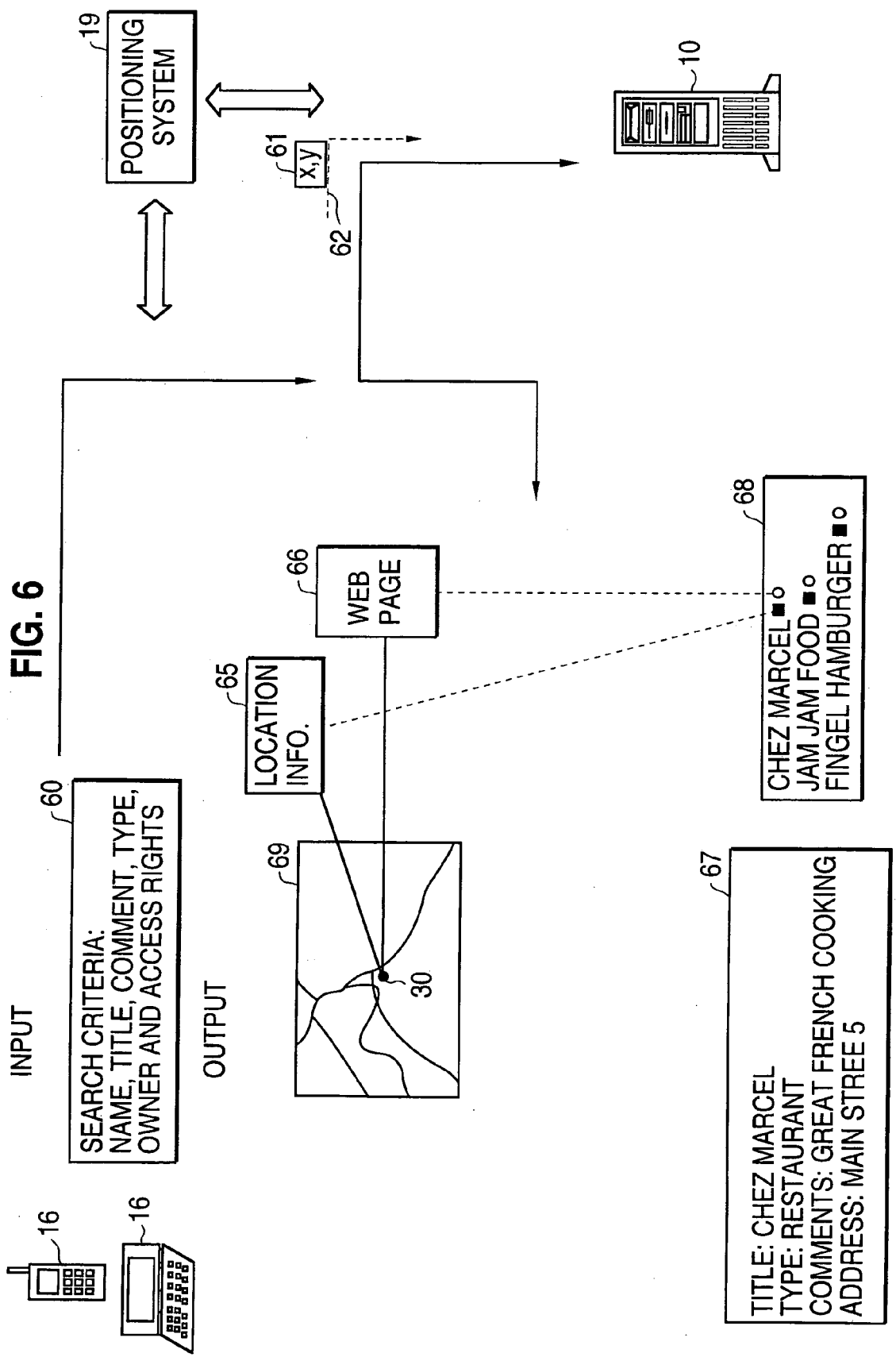

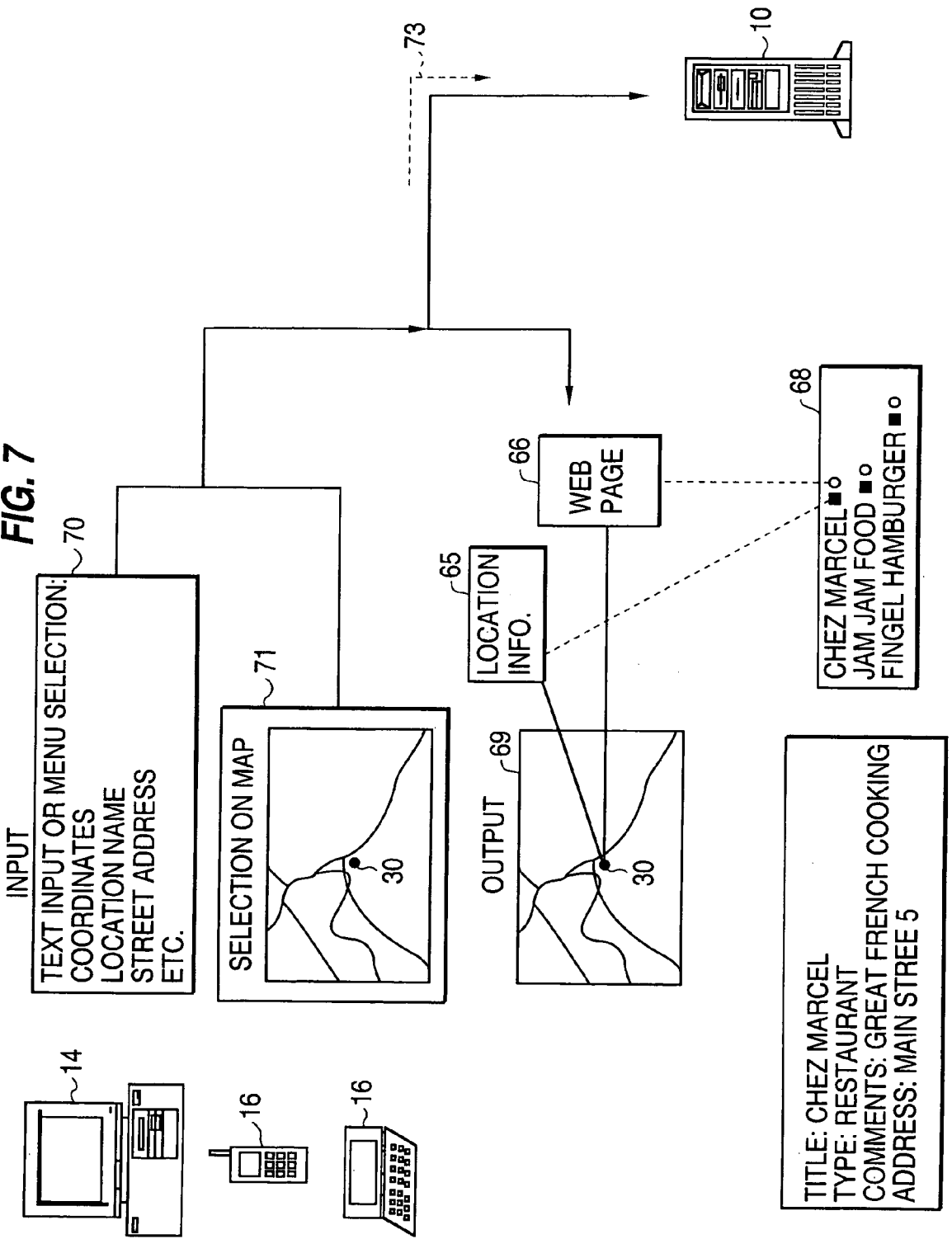

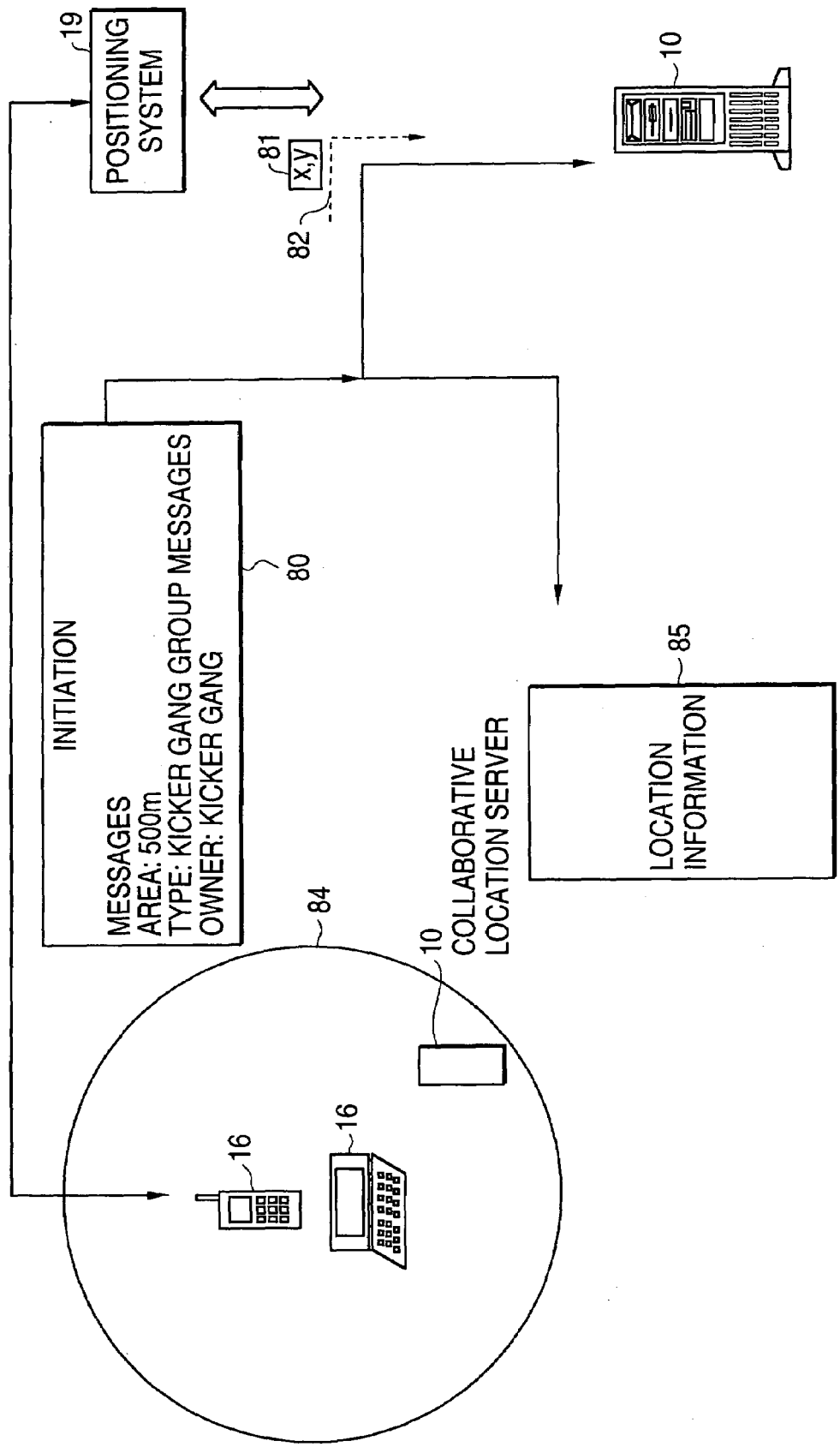

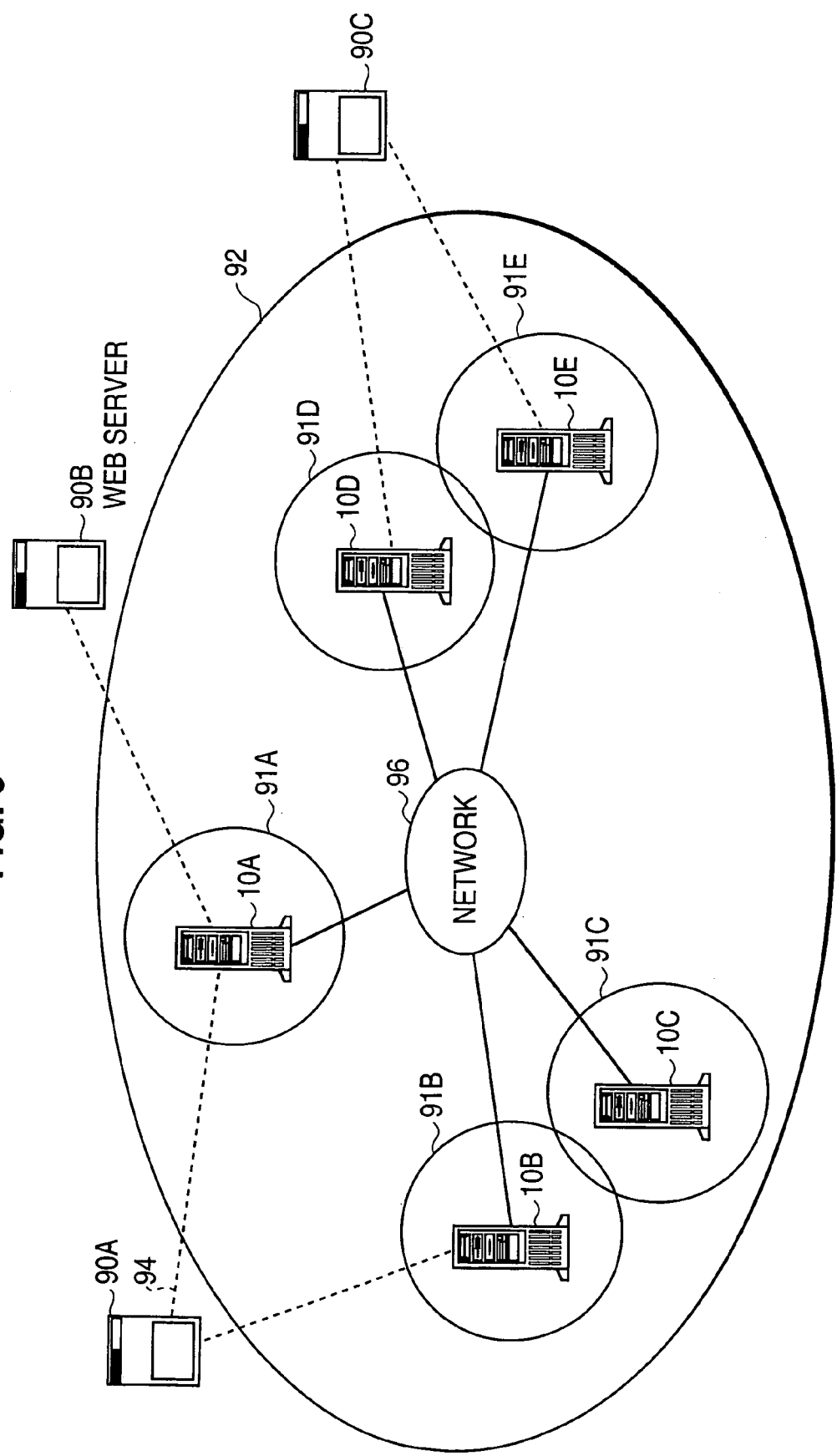

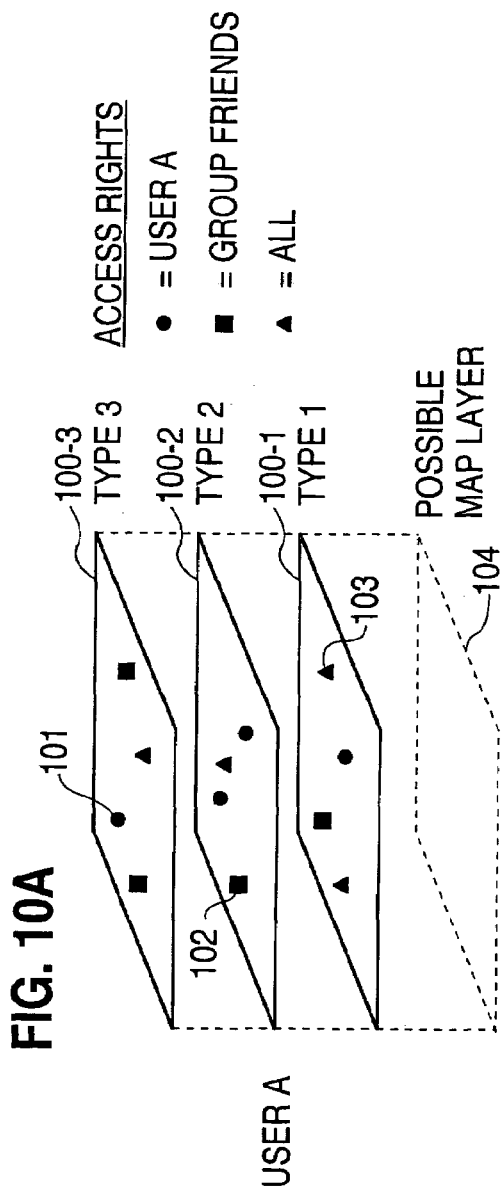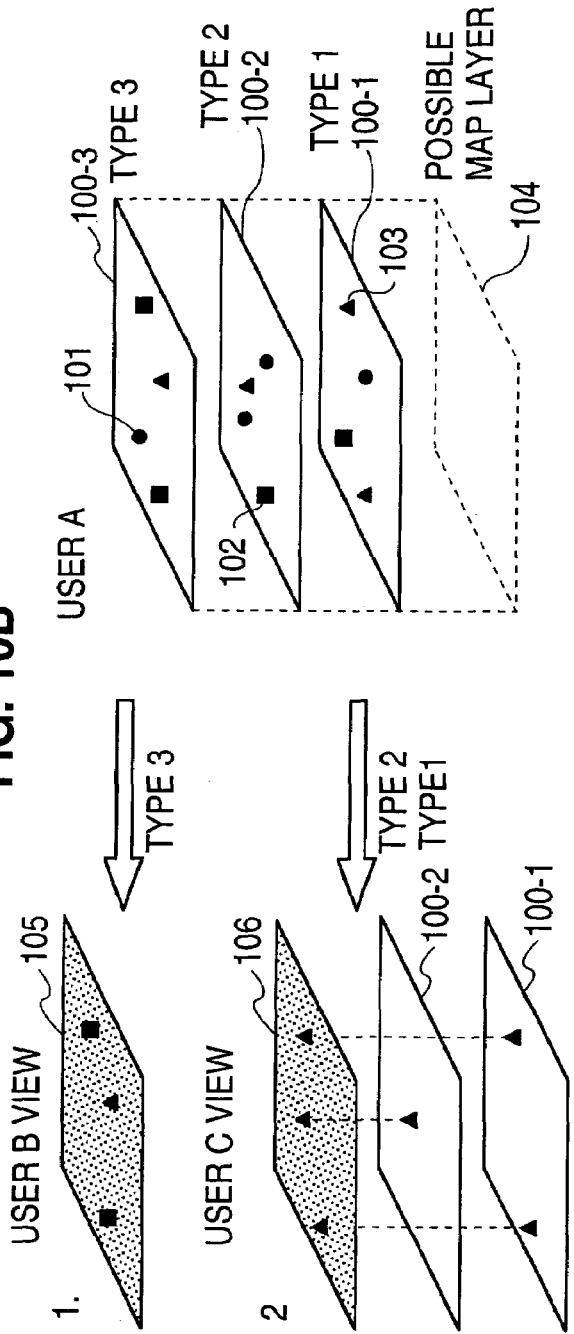
FIG. 10A
FIG. 10B

_US 6,983,313 B1_

COLLABORATIVE LOCATION SERVER/SYSTEM

TECHNICAL FIELD

The present invention relates to a method and apparatus for storing, retrieving and publishing information. More particularly, the present invention relates to a method and apparatus for storing, retrieving and publishing location information with respect to a geographical point based on positioning information.

BACKGROUND OF THE INVENTION

On line search and retrieval systems have been proposed which allow a user to search and retrieve data stored in a database. Examples of such search and retrieval systems are disclosed, for example, by U.S. Pat. Nos. 5,032,989 and 5,682,525 and web pages WWW.MAPQUEST.COM and WWW.CYBERHOMES.COM.

U.S. Pat. No. 5,032,989 discloses a real estate search and location system and method which allows a user to locate available real estate property for sale, lease or rental using a database of available properties at central and remote stations. U.S. Pat. No. 5,032,989 particularly allows a user to select a desired region on a map of areas of interest using a graphical interface and to locate property that fits predetermined criteria within the region.

U.S. Pat. No. 5,682,525 discloses a system and method for allowing a user to access a common database from a remote communications port at any qualified location so as to generate a map or other positional information which locates selected items of interest. U.S. Pat. No. 5,682,525 particularly allows a user to input information concerning a vicinity and select for display items of interest within the vicinity.

The web page WWW.MAPQUEST.COM allows users to obtain various maps of interest based on user input information. The user can select a map for an area of interest or a map which provides door-to-door and city-to-city driving directions. When the user desires to obtain a map of a particular area, the user inputs information concerning the area of interest. When the user desires driving directions, the user inputs information concerning the starting address and destination address.

The web page at WWW.CYBERHOMES.COM allows a user to perform online real estate search at the street level. First, the user inputs information concerning the area of interest or a particular real estate of interest. Thereafter, information concerning real estate in the area of interest or information concerning the particular real estate is retrieved and displayed for the user.

The above described conventional techniques suffer from various disadvantages. Particularly, the above described conventional techniques do not allow for one or more users to not only retrieve information concerning a geographical item of interest but also to store additional information concerning the geographical item of interest, modify existing information concerning the geographical item of interest, create new information concerning a geographical point of interest or publish such information. The above mentioned conventional techniques does not enable a user to publish/share the information concerning a geographical point of interest with selected other users if desired. Further, the above described conventional techniques do not allow for the storage, retrieval and publishing of information concerning a geographical item interest when the user is positioned near the geographical item of interest. Still further, the above disclosed conventional techniques do not allow for the decentralization of information concerning a geographical item of interest since all information to be searched and/or retrieved are stored in a central database.

SUMMARY OF THE INVENTION

The present invention provides a method and apparatus for storing, retrieving and publishing location information with respect to a geographical point based on positioning information. Specifically, the present invention provides a collaborative location server and a collaborative location system for storing, retrieving and publishing location information with respect to a geographical point based on positioning information.

The collaborative location server of the present invention includes a storage which stores location information in corresponding relation to each of a plurality of geographical points. The geographical points can, for example, be existing geographical points or newly created and/or identified geographical points. The location information provides information concerning a corresponding geographical point such as, for example, position information including geographical coordinates of the geographical point, identification information of the geographical point including a name, title information of the location information including a title, type information of the geographical point including information concerning a type of the geographical point, owner information of the geographical point including information of the owner of the location information or the geographical point, access right information of the location information including information of access rights of various users of the location information, comment information including comments of a creator or other user with access to the location information, link information including information for linking the location information to other information, and date information including time and date of creation and possible expiration date of the location information.

The collaborative location server further includes storage and retrieval apparatus, responsive to a storage and retrieval request including positioning information, for storing or retrieving location information concerning a geographical point corresponding to the positioning information. The positioning information of the present invention can, for example, be provided by a positioning system to a mobile terminal to indicate the geographical position of the mobile terminal. The mobile terminal includes the positioning information in a storage and retrieval request which is transmitted by the mobile terminal to the collaborative location server. The positioning information can also be requested from the positioning system by the collaborative location server upon receipt of a storage and retrieval request and matched with the storage and retrieval request based on information contained therein.

The positioning information alternatively can be input provided by a user operating a terminal rather than by determining the position of the terminal by a positioning system. Thus, for example, the user of a terminal could input positioning information concerning any of a plurality of geographical points of interest. The positioning information input by the user in the terminal need not be related to the geographical position of the terminal.

The location information stored in corresponding relation to each of the geographical points can, for example, be a virtual electronic document providing textual and graphical information concerning the corresponding geographical point. The virtual electronic document could, for example, be a web page which can be linked to other web pages. The link information included in the location information can, for example, be linked to a web page which contains textural and graphical information concerning the geographical point of interest. The location information can be published/shared with other users according to the access rights defined for the location information. It should be noted that links to other web pages can also be provided in any of the other information included in the location information. The web pages can be situated on external web servers located in a network to which the collaborated location server has access.

The collaborative location server can also operate in a mode where positioning information of a mobile terminal is automatically transmitted to the collaborative location server on a periodic basis. The collaborative location server, based on such positioning information, retrieves location information of a geographical point corresponding to the positioning information and automatically supplies the retrieved location information to the mobile terminal. In other words, the location information is automatically pushed to the mobile terminal in response to positioning information automatically supplied to the collaborative location server indicating a geographical position of the mobile terminal.

The present invention further provides a collaborative location server system having a network of collaborative location servers. The location information stored in the collaborative location servers can be linked to web pages on external web servers situated on a network to which the collaborative location servers have access. Any number of web pages and web servers can be made to correspond to a geographical point or linked to location information corresponding to the geographical point.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 5 is a schematic diagram illustrating the process of storing location information by a terminal without positioning of the terminal;

FIG. 6 is a schematic diagram illustrating the process of requesting location information when the geographical position of the mobile terminal is near the geographical point corresponding to the location information;

FIG. 7 is a schematic diagram illustrating the process of requesting location information without determining the geographical position of the terminal requesting location information;

FIG. 8 is a schematic diagram illustrating the process of pushing location information from the server to a mobile terminal when the mobile terminal is positioned near geographical points;

FIG. 9 is a schematic diagram illustrating a collaborative location system including a network of collaborative location servers of the present invention;

FIGS. 10a and b are schematic diagrams illustrating different views of the location information based on different search criteria.

DETAILED DESCRIPTION OF THE INVENTION

Figure 1B:
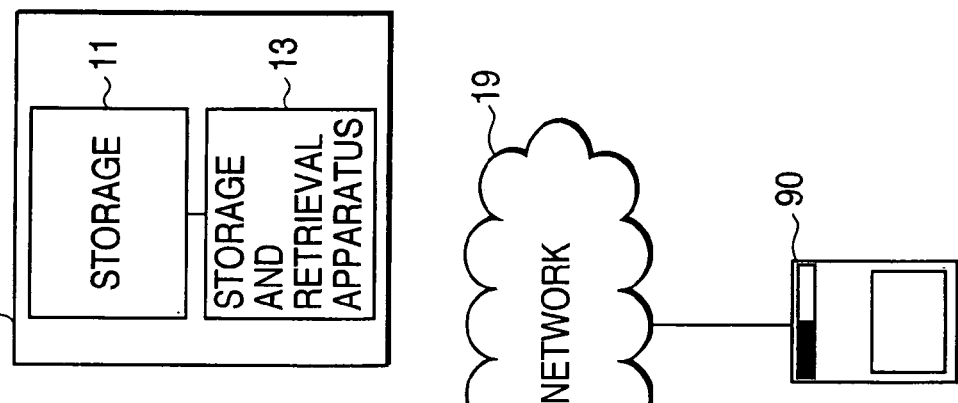
FIGS. 1a and b are schematic diagrams illustrating the collaborative location server of the present invention connected to a network.
Figure 1A:
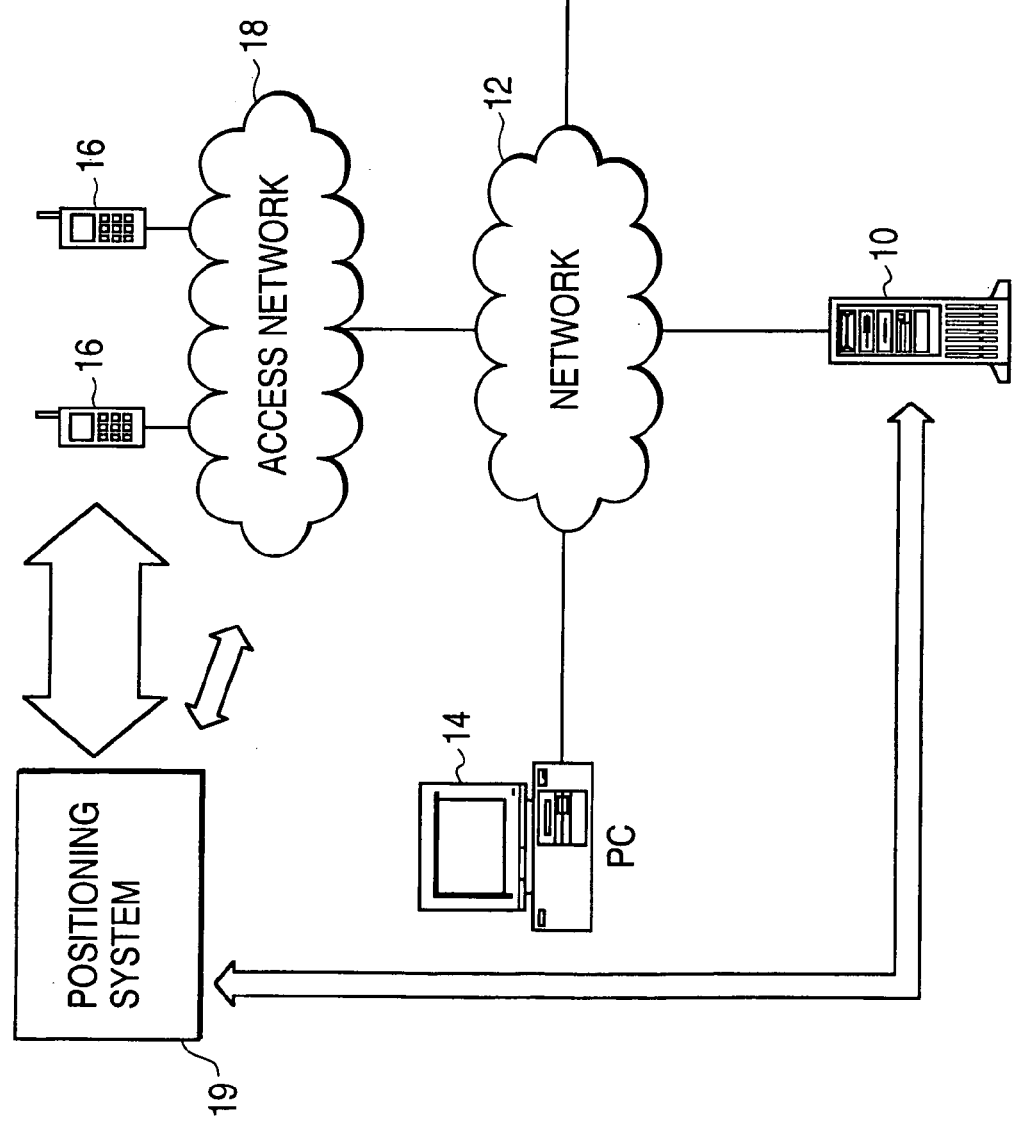

The present invention as illustrated in FIGS. 1a and b provides a collaborative location server 10 for storing and retrieving location information with respect to a plurality of geographical points. The collaborative location server 10 is connectable to a network 12 (i.e., internet, intranet, LAN, etc.) and includes a storage 11 to which a user can store and retrieve location information in corresponding relation to each of a plurality of geographical points. The server 10 could be provided by an information processing apparatus, computer, workstation, server or the like well known to those of ordinary skill in the art. The geographical points can, for example, be physical locations such as houses, restaurants, tourist sites, hiking trails, parking lots, etc.

Figure 2:
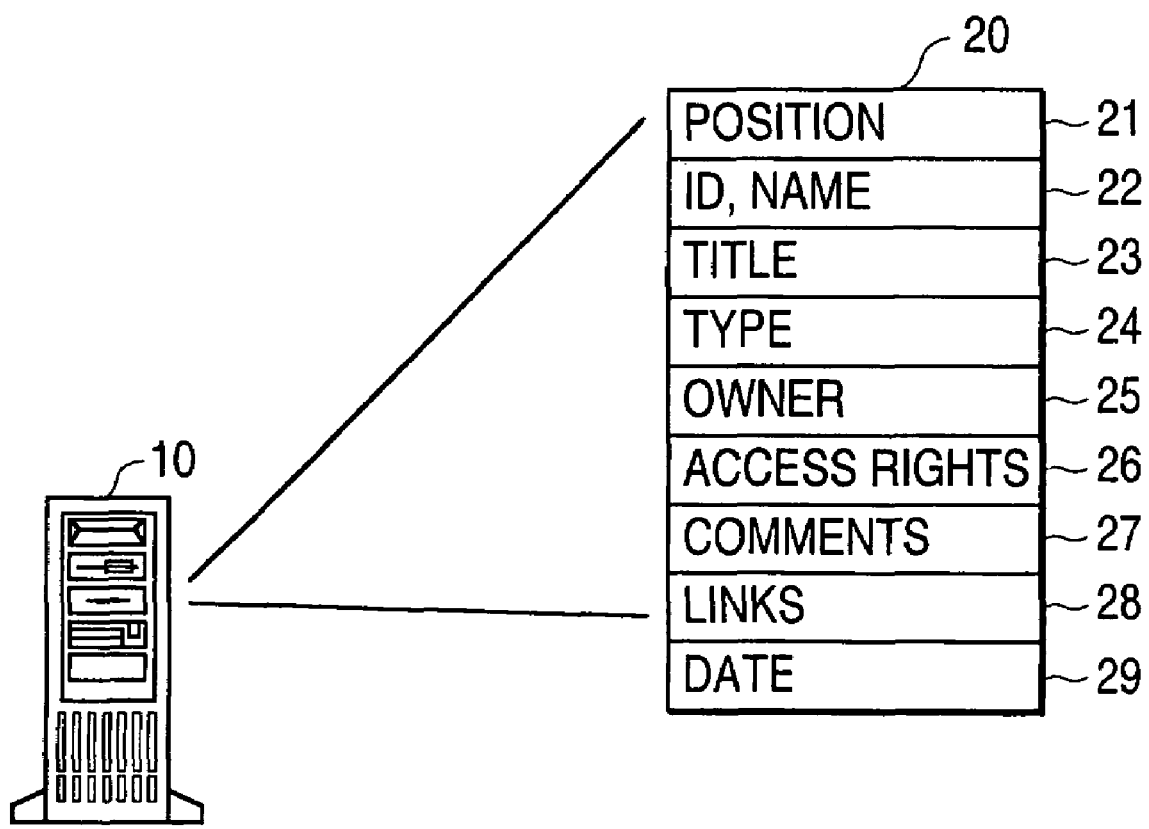
FIG. 2 is a schematic diagram illustrating the collaborative location server and the data structure of the location information of the present invention.

The location information provides information concerning the geographical points in the form of a data structure 20 as illustrated in FIG. 2. The data structure 20 of the location information could, for example, include position information 21 of the geographical point including geographical coordinates, identification (ID) information 22 of the geographical point including a name, title information 23 of the location information including a title of the location information, type information 24 of the geographical point including information concerning a type of the geographical point, owner information 25 of the location information or the geographical point including information of the owner of the location information or geographical point, access right information 26 of the location information including information of access rights of users to the location information, comment information 27 including comments of a creator or user having access to the location information, link information 28 including information for linking the location information to other information, and date information including time and date of creation and possible expiration date of the location information. The location information can be freely modified, updated, deleted, or added to according to the access rights defined for the location information by the access rights information. In addition to manipulating existing location information, new location information regarding a geographical point can be created. Any of the information contained in the location information including link information 28 can contain links to web pages.

The location information stored in the collaborative location server 10 can be accessed by any of a plurality of different types of users according to access rights defined for the location information. The location information can be published/shared with other users according to the access rights defined for the location information. A user can operate, for example, a stationary terminal 14 such as a PC, processing equipment, etc. or a mobile terminal 16 such as a mobile telephone, laptop computer, personal communication system, etc. The mobile terminals 16 are connected to the collaborative location server 10 through their own access network 18 which is connected to the network 12. The access network 18 can be of the wireless type (i.e., GSM, CDMA, etc.). The network 12 can, for example, be the internet, an intranet, a public switch telephone network (PSTN), etc. The location information stored in the collaborative server 10 can, for example, be a web page, or may provide links to web pages located at external web servers 90 situated on a network to which the collaborative location server has access. These links as per the above can be included in any of the information contained in the location information including the link information 28.

As shown in FIG. 1b, the collaborative location server 10, in addition to the storage 11 where location information is stored, also includes a storage and retrieval apparatus 13 which is responsive to a storage and retrieval request from any of a plurality of users using terminals 14 and 16. The storage and retrieval request includes positioning information which is either provided by a positioning system 19 indicating the geographical position of the mobile terminal 16 or input by a user using, for example, a terminal 14, 16. The storage and retrieval apparatus 13 stores or retrieves location information concerning a geographical point corresponding to the positioning information. Thus, for example, if the user wishes to create new location information or modify, update, delete, or add to existing location information corresponding to a geographical point, and corresponding to the positioning information, then such data is stored by the storage and retrieval apparatus 13. However, if the user merely wishes to retrieve location information corresponding to the positioning information, then such location information is retrieved and then transmitted to the terminal 14, 16 being used by the user.

The collaborative location server of the present invention is particularly useful in allowing multiple users to have access to location information corresponding to certain geographical points based on positioning information of the terminals being used by the users. The collaborative location server 10 could, for example, inform a user of a mobile terminal 16 of specific types of location information when the geographical position of the user is near a particular geographical point. Such location information could, for example, be information of restaurants in the area, tourist sites, hospitals or even, for example, maps of parking lots or hiking trails. Further, the collaborative location server 10 of the present invention is useful in allowing users of mobile terminals 16 to create new location information or update, modify, delete, or add to existing location information concerning a geographical point. The present invention also allows the user to publish/share the location information with other users. The location information could, for example, be the location and description of power lines, descriptive information of houses to be inspected, utility meter reading information and the like. The user can also decide with whom to share the location information.

Figure 3:
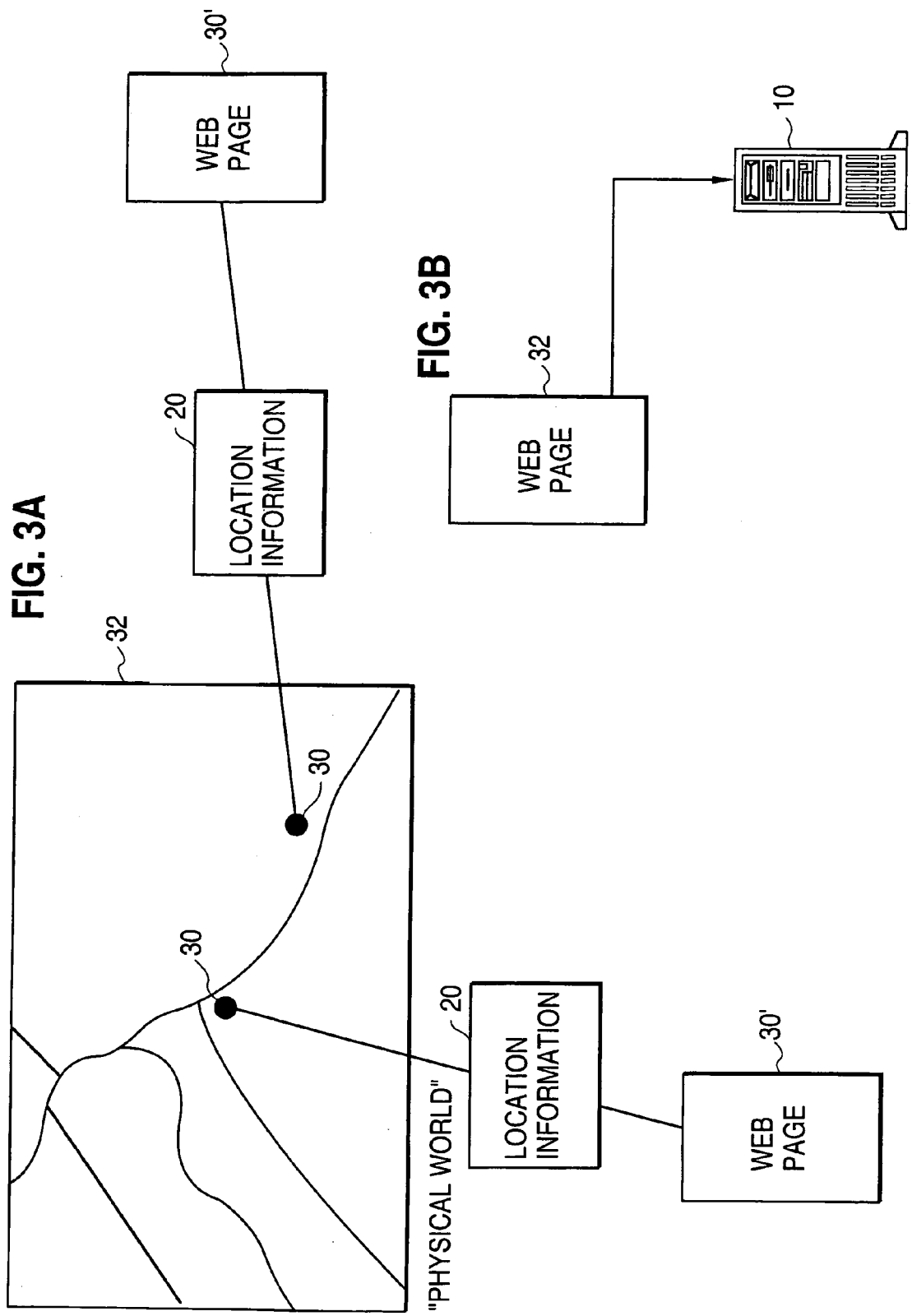
FIGS. 3a and b are schematic diagrams illustrating the link between the location information and electronic documents.

The location information stored in the collaborative location server 10 of the present invention includes linking information which allows the location information to be linked to web pages such as illustrated, for example, in FIG. 3a, wherein a plurality of geographical points 30 are laid out in a map 32 of the "physical world". The map 32 could, for example, be a street map, city map, hiking trails or any other type of map representative of the "physical world". Accordingly, the present invention links the virtual world to the physical world. The creator or any user having access to the location information can set such linking information in any of the information contained in the location information including the link information 28.

As described above, the storage 11 of the collaborative location server 10 has stored therein location information in a data structure 20 in corresponding relation to each of a plurality of geographical points 30. Thus, as illustrated in FIG. 3a each location information data structure 20 corresponds to a geographical point 30. The location information data structure 20 as described above includes linking information which links the location information 20 to another electronic document 30 such as a web page or the like. Thus, when a user transmits a storage and retrieval request requesting particular location information based on positioning information, the location information is retrieved. If the location information contains links, then the user can access the web pages linked by the linking information. Thus, the web page linked to the location information by the linking information can also be retrieved by the user.

As illustrated in FIG. 3b, the location information can, in of itself, be an electronic document/web page 32. Thus, when a user requests retrieval of particular location information based on positioning information, the location information is retrieved as an electronic document/web page 32. Of course, the electronic document/web page 32 itself can contain links.

Figure 4:
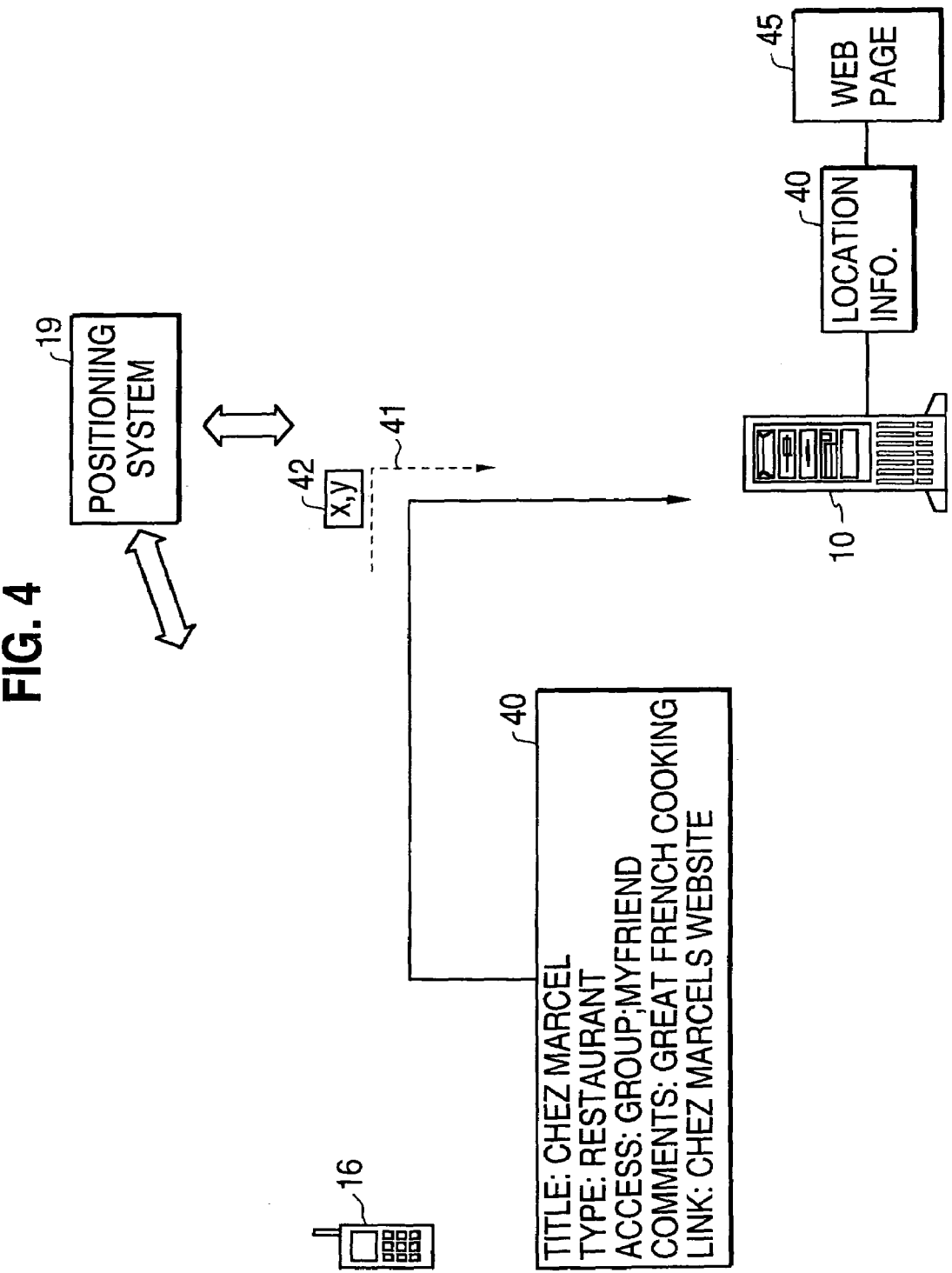
FIG. 4 is a schematic diagram illustrating the process of storing location information by a mobile terminal with positioning of the mobile terminal.

FIG. 4 illustrates the process of storing location information by a mobile terminal 16 with positioning of the mobile terminal. The process proceeds as follows. As illustrated in FIG. 4, when a user of a mobile terminal 16 desires to store location information in the collaborative location server 10 for later use, the user of the mobile terminal 16 inputs the location information 40 to be stored into the mobile terminal 16. The location information 40 to be stored may, for example, include title information, Chez Marcel, type information, restaurants, access rights information, group: my friend, comment information, great french cooking, and linking information linking the Chez Marcel web page. Thus, the user has input location information concerning a restaurant named Chez Marcel, that the restaurant has great french cooking and that the information can be accessed by a group or users called my friend. Further, the user links the location information to the web page of the restaurant Chez Marcel. The Chez Marcel web page can itself contain links.

The user then transmits, by the mobile terminal 16, the location information 40 as a storage and retrieval request 41 including positioning information 42 to the collaborative location server. The positioning information 42 is supplied to the mobile terminal 16 by the positioning system 19. It should be noted that the positioning information can alternatively be requested from the positioning system 19 by the collaborative location server 10 upon receipt of a storage and retrieval request and then matched to the storage and retrieval request.

The storage and retrieval apparatus 13 in response to the storage and retrieval request 41, including positioning information 42, stores the location information 40 in corresponding relation to the geographical point. The geographical point can be an existing geographical point or a new created or identified geographical point. The storage and retrieval apparatus 13 can use optimization techniques such as storing the location information 40 in corresponding relation to an existing geographical point which according to the position information is near the geographical position of the mobile terminal 16, or suggest to the user geographical points near the location of the user to which the user could attached the location information. The location information 40 once stored in the storage 11 of the collaborative location server 10 provides a link through the linking information to the web page 45 of Chez Marcel.

It should be noted that the positioning system 19 can be provided, for example, by a global positioning system or by the access network 18. The access network 18 could, for example, provide an indication of the location of the mobile terminal 16 by indicating the cell in which the mobile terminal 16 is located or by determining the geographical position of the mobile terminal 16 by a triangulation technique. The present invention can operate using either of the techniques since the present invention is not concerned with how the positioning information is determined. With respect to stationary terminals 14, such positioning information can be input by the user as part of the storage and retrieval request. Thus, such positioning information could, for example, be points on a map selected by a user, geographical coordinates, addresses, names of locations or regions etc.

The process of storing location information by transmitting a storage and retrieval request from a terminal to the collaborative location server 10 without determining the position of the terminal 14 and 16 is illustrated in FIG. 5. It should be noted that the terminal in this situation can be either a stationary terminal 14 or a mobile terminal 16.

The process proceeds as follows. The user of the terminal 14 or 16 through a text input or menu selection, inputs a storage and retrieval request for storing location information of a geographical point of interest. Positioning information concerning the geographical point of interest could, for example, be a textural input or menu selection 50 or a selection on a map 52. The textural input or menu selection 50 could, for example, include the input of coordinates of the geographical point, the location name of the geographical point, the street address of the geographical point or any other such information. The input of positioning information by selection on a map 52 can be accomplished by displaying on the screen of the terminal 14 and 16 a map of an area of interest and allowing a user, using an input device such as, for example, a mouse, to select the geographical point of interest by double clicking the mouse.

Once the geographical point has been identified then the user can input location information 54 concerning the geographical point of interest. Thus, for example, if the geographical point of interest is Chez Marcel's restaurant the user would input as location information title information: Chez Marcel, type information: restaurant, access rights information: group my friend, comment information: great french cooking, and link information: Chez Marcel's web page.

Thereafter, the location information 54 is combined with the input positioning information so as to form a storage and retrieval request 56 which is sent to the collaborative location server 10. The storage and retrieval apparatus 13 of the collaborative location server 10, in response to the storage and retrieval request, then stores the input location information 54 as location information 40 in corresponding relation to the geographical point. The geographical point can be an existing geographical point or a newly created geographical point. The storage and retrieval apparatus 13 can use optimization techniques, such as storing the location information 40 in corresponding relation to an existing geographical point which according to the position information is near the geographical position of the mobile terminal 16, or suggest to the user geographical points near the location of the user to which the user could attached the location information. The location information 40 is stored as having a link to the Chez Marcel web page 45. Of course, as described above the link to the Chez Marcel web page can be formed by including linking information in any of the information contained in the location information including the link information 28.

FIG. 6 illustrates the process of retrieving location information when the mobile terminal 16 has a geographical position near the geographical point corresponding to the location information. The process proceeds as follows. The user having a mobile terminal 16 that can be positioned inputs search criteria 60 which may include information of at least one of the items of location information 60. Such search criteria could include, for example, name, title, comment, type, owner or access rights.

The geographical position of the mobile terminal 16 is determined by a positioning system 19. Positioning information 61 is generated and combined with the input search criteria 60 to form a storage and retrieval request 62 which is transmitted to the collaborative location server 10. The storage and retrieval request 62 is supplied to the storage and retrieval apparatus 13 of the collaborative location server 10 so as to cause the retrieval of location information concerning a geographical point corresponding to the positioning information. Of course, as per the above, the positioning information can be provided by the positioning system 19 in response to a request from the collaborative location server 10 upon receipt of the storage and retrieval request 62. The location information 65 retrieved from the storage by the storage and retrieval apparatus 13 of the collaborative location server 10 is transmitted back to the mobile terminal 16. Depending upon the capabilities of the mobile terminal 16 the location information 65 is presented in a number of different ways. For example, if the mobile terminal 16 can display a map, then when a point is selected on the map, the location information 65 is displayed in relation to the selected point on the display. Also the user is allowed to access the web page 66 referred to with links in the location information 65. Additionally, the location information 65 could provide information of the address of the geographical point or directions to the geographical point, for example, as part of the comments of the location information 65 or information of the web page 66 linked to the location information 65.

The mobile terminal 16 could alternatively display as an output the text 67 of the location information. Such text 67 could, for example, include the title, type, comments and address of the geographical point. Further, alternatively the mobile terminal 16 could output in text format link information 68 which provides in text format various descriptions of the geographical point. The link information 68 also includes links to the location information 65 which would provide descriptive information concerning the geographical points and links to web page 66 concerning the geographical point.

FIG. 7 illustrates the process of retrieving location information without determining the geographical position of the terminal requesting the location information. Thus, the terminal could, for example, be any one of a stationary terminal 14 or mobile terminal 16.

The process proceeds as follows. The user using any one of the terminals 14 and 16 inputs information of a particular geographical point. The input could be accomplished by the user inputting text or a menu selection 70 of any one of coordinates of the geographical point, location name of the geographical point, street address of the geographical point etc. The input could also be accomplished by the user selecting a particular geographical point 30 on a map 71. The input information, identifying a geographical point of interest, is provided as positioning information as part of a storage and retrieval request 73. The storage and retrieval request 73 including the positioning information is transmitted to the collaborative location server 10. The storage and retrieval apparatus 13, included in the collaborative location server 10, in response to the storage and retrieval request 73, including positioning information, retrieves location information concerning a geographical point corresponding to the positioning information. The location information is then transmitted from the collaborative location server 10 to the terminal 14, 16 and output by the terminal 14, 16 in a manner similar to that described with respect to FIG. 6. Namely, the location information is displayed on the screen of the terminal 14, 16 depending upon the capabilities of the terminal as described above.

FIG. 8 illustrates the process of pushing information from the collaborative location server to a mobile terminal when the mobile terminal is positioned in an area near particular geographical points. This feature of the present invention allows for a user having in his possession a mobile terminal 16 that can be positioned to be constantly updated with location information concerning geographical points of interest that the user approaches. The geographical points can, for example, be certain types of restaurants, historical sites, or the like. The geographical points of interest can also be location information stored by a particular group of users accessible only by users of the group when these users approach the geographical points.

The process proceeds as follows. At initiation 80 the user of a mobile terminal 16 can specify the types of location information of interest to the user. The types of location information of interest to the user may be specified by a particular radius of the user's current geographical position, type information indicating a type of information of interest to the user, for example, kicker gang group messages and owner information indicating the owner of such information of interest to the user such as, for example, kicker gang. The specified information of interest is sent as a storage and retrieval request 82 to the collaborative location server 10. The storage and retrieval apparatus 13, included in the collaborative location server 10, in response to the storage and retrieval request 82, stores the storage and retrieval request 82 for periodic processing. Continual processing of the stored storage and retrieval request 82, causes the storage and retrieval apparatus 13 to continually retrieve or receive location information and automatically transmit (push) the location information to the mobile terminal 16 depending upon its geographical position. The storage and retrieval apparatus 13 of the collaborative location server 10 accomplishes this by periodically receiving or retrieving positioning information concerning the current geographical position of the mobile terminal 16 from the terminal or the positioning system. The positioning information of the current geographical position of the mobile terminal 16 is compared to the geographical points stored in the storage. Based on the comparison, geographical points which fit within the radius 84 (500 m) specified by the user at initiation 80 are selected to determine whether the location information of such geographical points match further criteria specified by the user at initiation 80. Particularly, the criteria of location information of interest specified by the user at initiation 80 is compared to the location information of the selected geographical points that fit with the radius 84.

The location information that matches the specified criteria are selected and transmitted (automatically pushed) to the mobile terminal 16.

The location information being automatically pushed to the user of the mobile terminal 16 could, for example, be announcements of particular geographical points such as descriptions of the point, ratings of the point, advertisements, messages left by other users at the geographical point, announcements about unsafe conditions or hazards, navigational directions, or detailed directions of how to proceed to the geographical point of interest, etc. Here again, the location information can be linked to web pages for viewing by the user on the display of the mobile terminal 16 depending on its capabilities.

FIG. 9 illustrates a collaborative location system having a plurality of collaborative location servers 10 interconnected to each other by a network 96. Further, the collaborative location servers 10 can be connected to a network including web servers 90. The web servers 90 similar to the collaborative location servers 10 could be provided by an information processing apparatus, computer, workstation, server, or the like well known to those of ordinary skill in the art. The collaborative location servers 10 can contain references (links) 94 to web pages on web servers 90. It is possible to make reference to any web server 90 in the network. The collaborative location servers 10 and web servers 90 can be connected in a manner so that, for example, when a user of a mobile terminal 16 moves to a particular region 91 served by the collaborative location server 10, information concerning the region 91 can be supplied by a collaborative location server 10 and by the web server 90 to which the location information in the collaborative location servers 10 refer. Thus, for example, a user of a mobile terminal 16 moving into the region 91*a* would be able to access, due to positioning within the region 91, location information stored on collaborative location server 10*a*. The location information stored on collaborative location server 10*a* could, for example, be linked to web pages stored on web servers 90*a* and 90*b*. The web pages stored on any of the web servers 90, linked to location information on collaborative location server 10, could be, for example, any type of web page, including but not limited to web pages for restaurants in the region 91, department stores having particular sales within region, etc.

The following is a description, with respect to the network of collaborative location servers illustrated in FIG. 9, of how location information is stored and retrieved from the proper collaborative location server. As described above, each collaborative location server services a particular region, wherein some of the regions may overlap. The present invention provides two different mechanisms for directing storage and retrieval requests to the appropriate collaborative location server. These two different mechanisms are described below.

Figure 11A:
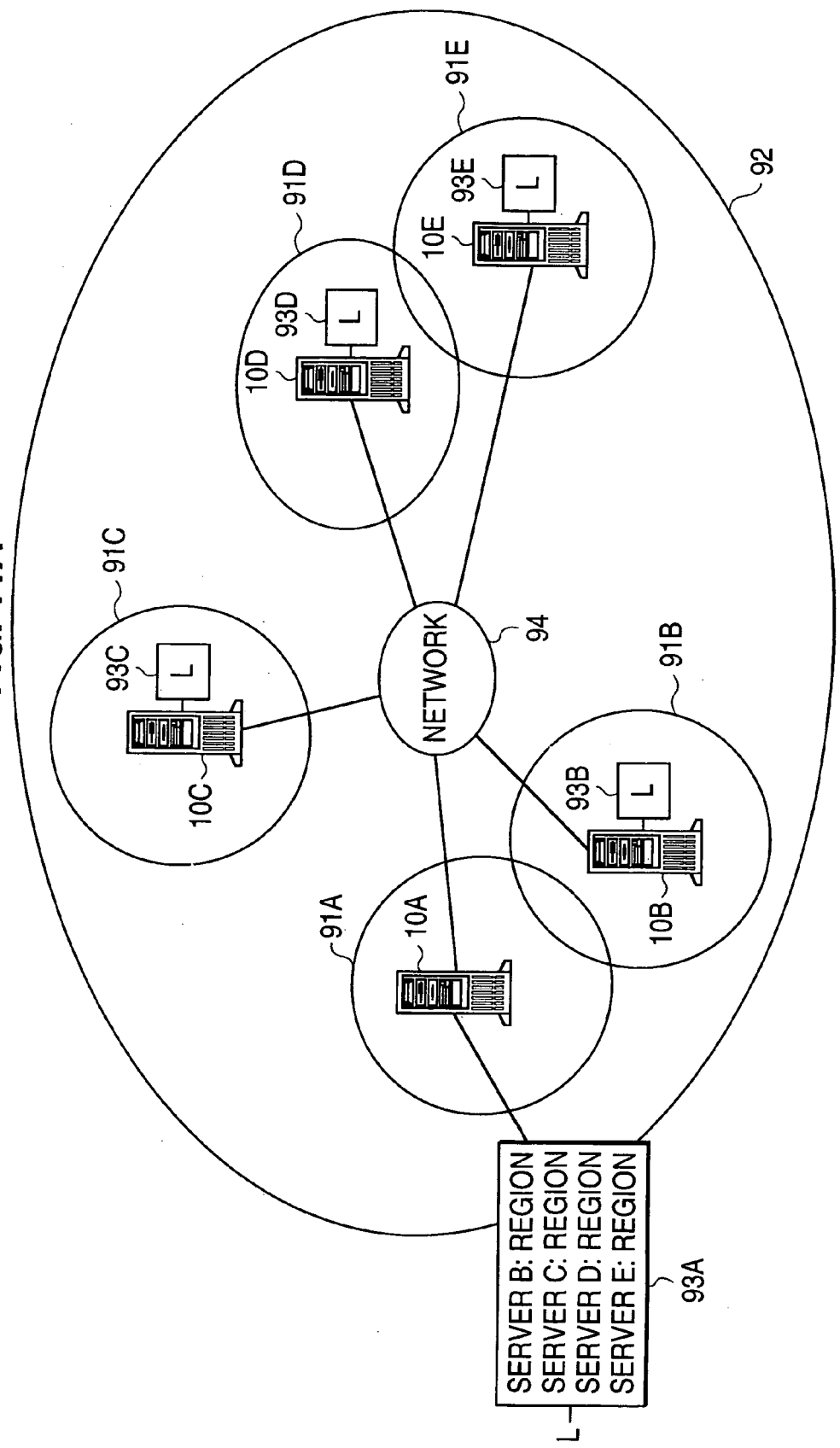
FIGS. 11a and b are schematic diagrams illustrating the different schemes for operating the network of collaborative location servers of FIG. 9.

The first mechanism for directing storage and retrieval requests to the appropriate collaborative location server illustrated in FIG. 11*a*, operates in a system similar to that illustrated in FIG. 9, wherein a plurality of collaborative location servers 10 are interconnected to each other by a network 94. Each collaborative location server 10 services a particular region 91.

In the first mechanism, storage and retrieval requests are directed to the appropriate collaborative location server by providing each collaborative location server 10 with a list 93 including information concerning each of the other collaborative location servers 10 interconnected by the network 94.

The information included in the list could, for example, describe an address, name or the like of each collaborative location server 10 connected to the network 94 and a region 91 serviced by the collaborative location server 10. Thus, as illustrated in FIG. 11*a*, the list 93*a* contained in collaborative location server 10*a* includes information which identifies each of the other servers 10*b–e* in corresponding relation to the regions 91*b–e* serviced by the other collaborative location servers 10*b–e*.

In the first mechanism, a protocol for messaging between the collaborative location servers 10*a–e* is provided so as to, for example, indicate to each of the collaborative location servers 10 when a new collaborative location server has been added to the network and when a collaborative location server has been removed from the network or for checking the status of other servers.

Each collaborative location server 10, upon receipt of a storage and retrieval request for a geographical position, which is not contained in the region serviced by the collaborative location server 10, queries the list 93 to determine the appropriate collaborative location server 10 serving the region containing the geographical point. After this the storage and retrieval request is redirected to the selected collaborative location server 10. If an appropriate collaborative location server has not been found, the messaging protocol can include mechanisms for sending out a broadcast message inquiring of the other collaborative location servers 10 to determine an appropriate collaborative location server 10.

Figure 11B:
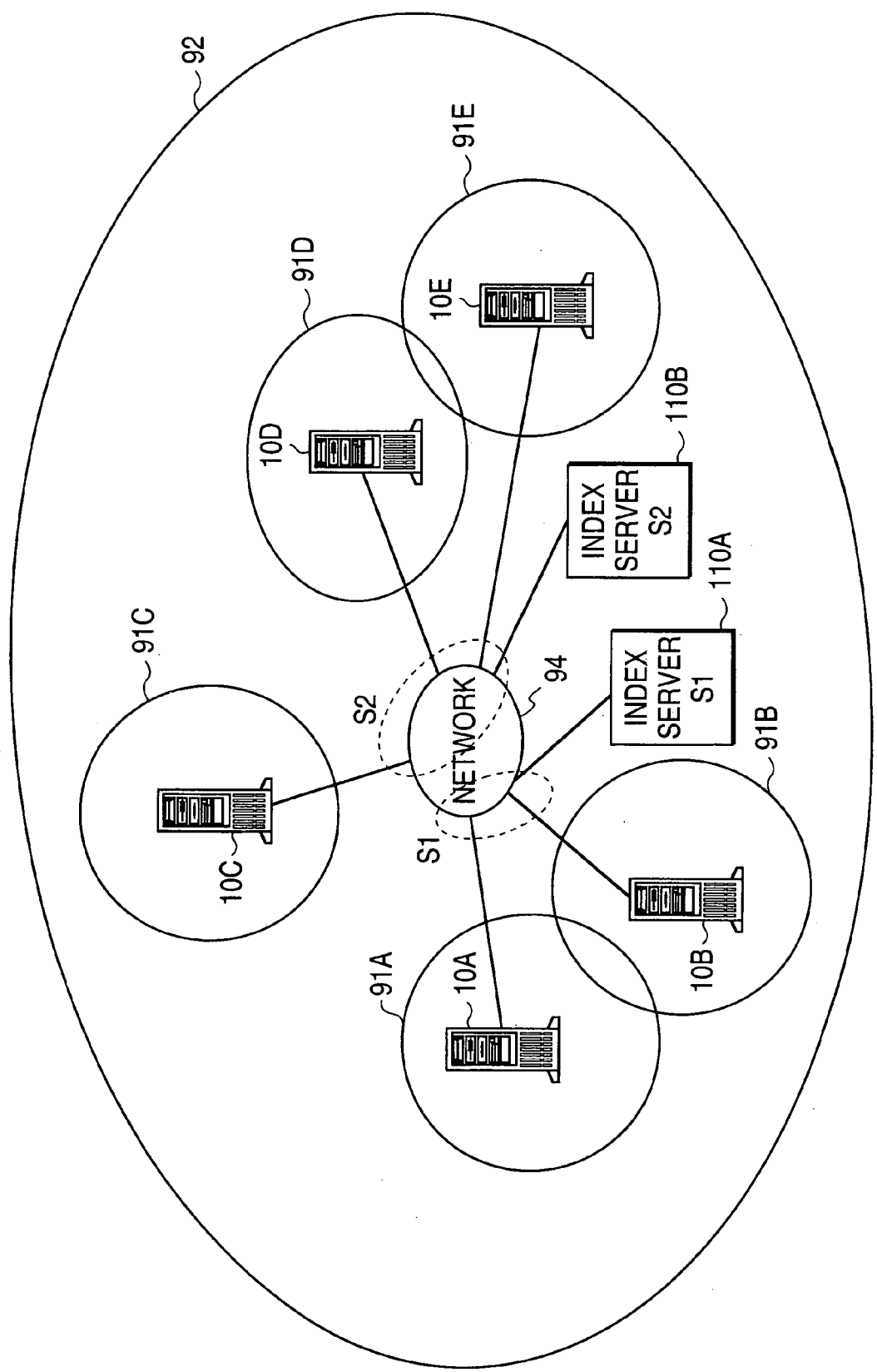

The second mechanism, for directing storage and retrieval requests to the appropriate collaborative location server illustrated in FIG. 11*b*, operates in a system similar to that illustrated in FIG. 9, wherein a plurality of collaborative location servers 10 are interconnected to each other by a network 94. Each collaborative location server 10 services a particular region 91.

In the second mechanism, storage and retrieval requests are directed to the appropriate collaborative location server by providing at least one index server 110 which operates similar to Domain Name Servers on the Internet. Each index server 110 keeps track of the collaborative location servers and services at least one collaborative location server 10 contained in its region domain. Thus, as illustrated in FIG. 11*b* index server S1 110*a* services collaborative location servers 10*a* and 10*b* and index server S2 110*b* services collaborative location servers 10*c–e*. Each index server 110 maintains a list of servers it services in its region domain and may cache information from other index servers 110. Each index server 110 is informed when a collaborative location server within its domain region is added or removed and may receive similar information from the other index servers 110 connected to the network. Each index server 110 can handle inquiries from a collaborative location server. The index servers 110 may be arranged in a hierarchical configuration.

In the second mechanism, each collaborative location server 10, upon receipt of a storage and retrieval request of a geographical position not contained in the region serviced by the collaborative location server 10, transmits an inquiry to the index server 110 which services the domain region containing the collaborative location server 10. The index server searches information contained therein concerning the regions being serviced by the collaborative location servers contained within its domain region and other information transmitted from the other index servers so as to determine the appropriate collaborative location server which services the region containing geographical position of interest. In case the index server 110 does not have information about a collaborative location server 10 appropriate for the region, the index server 110 queries another index server in the same manner as domain name servers. Once the appropriate collaborative location server has been determined an answer indicating such is provided to the transmitting collaborative location server 10, thereby allowing the transmitting collaborative location server to determine the appropriate collaborative location server for processing the storage and retrieval request.

So as to fully understand how the first and second mechanisms for directing storage and retrieval requests to the appropriate collaborative location server operates the following description is provided with respect to FIGS. 11*a* and *b*.

When a user initiates a process of storing or retrieving location information, a storage and retrieval request is generated and forwarded to the collaborative location server 10. The storage and retrieval request information can, for example, be transmitted to the collaborative location server which was last contacted by the user or a default collaborative location server. The collaborative location server upon receipt of the storage and retrieval request performs a process to determiner whether it services the region containing the geographical position corresponding to the location information the user wants to store or retrieve. If the collaborative location server services the region containing the geographical position, then the collaborative location server responds in the manner described above. However, if the collaborative location server does not service the region containing the geographical position of interest, then the collaborative location server must perform a process so as to determine which of the collaborative location servers connected to the network 94 services the region containing the geographical position of interest. If the user is operating in a network of collaborative location servers that implement the first mechanism described above, then the appropriate server is determined from the internal list 93 listing other collaborative location servers 10 and the domain they are serving. In case an appropriate location server is not found in the list, the server can make a network broadcast to determine whether an appropriate location server exists. If an appropriate collaborative location server serving the region receives the message, it announces its presence to the sending collaborative location server and its information is added to the internal list 93. If the user is operating in a network of collaborative location servers implementing the second mechanism as described above, then a request requesting information of a collaborative location server which services the region containing the geographical position of interest is sent to the index server 110 which services the domain region containing the collaborative location server which transmitted the request as illustrated in FIG. 11*b*.

As a result of the processing according to the first and second mechanisms an answer indicating the appropriate collaborative location server to which the storage and retrieval request should be directed is provided to the collaborative location server which transmitted the inquiry/request. If no answer is provided then an error arises. Thereafter, processing of the storage and retrieval request so as to store location information is then handled by the collaborative location server identified in the answer.

When a user initiates a push query, the processing is similar to that described above with respect to the storing and retrieving of location information. However, the first and second mechanisms are implemented at the time the user moves outside of a region currently handling storage and retrieval requests from the user. Specifically, when the user moves outside of the region serviced by a collaborative location server currently handling storage and retrieval requests from the user, the internal list 93 is queried according to the first mechanism or a request is sent to an index server 110 according to the second mechanism. Once the appropriate collaborative location server has been identified according to the answer to the inquiry/request then processing of the storage and retrieval request is handled by the identified collaborative location server.

FIGS. 10a and b illustrate how different views of the stored location information can be created. Data of the location information is stored in the storage 11 of the collaborative location server 10 according to some data structure. The data structure of the present invention can be of any format so long as dynamic views of the data can be obtained based on various search criteria. Thus, the illustrations in FIGS. 10a and b should be considered for illustrating an example of how different views to the stored data would appear but not limited thereto. The illustrations in FIGS. 10a and b should not be considered as specifying any particular embodiment of the data structures of storage mechanism of the data of the location information.

Therefore, considering FIG. 10a, for example purposes only, the location information stored in corresponding relation to geographical points by user A can be viewed, for example, according to the type of location information. The location information could be viewed as several layers 100-1 through 100-3 corresponding to the types of location information. The location information can be mapped to a map layer 104. The layers could present, for example, types of restaurants, types of gas stations, types of cinemas, etc. Each location information also has defined therein access rights for controlling access to the location information.

FIG. 10b illustrates an example of different data set views created by different search criteria. For example, if a user B has requested, by a storage and retrieval request, all type-3 100-3 location information owned by user A then, for example, if user A and B belong to the same group of users namely group friends users then the collaborative location server will retrieve location information of all geographical points accessible by all users and group friends users. Thus, the view seen by user B would correspond to the user B view 105. Another example of a different data set view created by different search criteria is that illustrated when, for example, a user C has requested all type-2 100-2 and type-1 1001 location information of user A. If user C and user A do not belong to the same user group, user C will only retrieve location information concerning geographical points available to all users. Thus, user C would obtain a view such as user C view 106.

It should be noted that the above described examples of the creation of views and the requesting of information are merely examples. Other modifications known to those of ordinary skill in the art could also be accomplished.

Based on the above described features, the method and apparatus of the present invention provides a collaborative location server and system for storing, retrieving and publishing location information with respect to a geographical point. The collaborative location server includes a storage which stores location information in corresponding relation to each of a plurality of geographical points. The geographical points can be existing geographical points or newly created or identified geographical points to which new location information is to be associated. The location information provides information concerning the geographical points. The collaborative location server also includes storage and retrieval apparatus, responsive to a storage and retrieval request including positioning information, for storing or retrieving location information concerning a geographical point corresponding to the positioning information. The collaborative location server, based on positioning information of a terminal with respect to a geographical point, allows a user of a terminal to store or retrieve location information concerning the geographical point. The positioning information can be determined by a positioning system or can be input by the user. The location information can provide information concerning the geographical point and the location information can be linked to web pages which may provide additional and more complete information concerning the geographical point. Thus, the present invention provides a link between the physical world and the virtual world. While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

I claim:

1. A collaborative location server, operatively connected to a network, for storing, retrieving and publishing information input by a plurality of users of mobile terminals with respect to geographical points, comprising:

a storage which stores location information, including user inputted information in corresponding relation to each of a plurality of geographical points, said location information including information concerning said geographical points and access right information relating to said user inputted information;

wherein said user inputted information is stored in said storage along with the location information by mobile terminal users positioned in a vicinity of at least one of the plurality of geographical points for use by other mobile terminal users when positioned in the vicinity of said at least one of the plurality of geographical points;

storage means responsive to a storage request, including positioning information and access right information, initiated by a first mobile terminal user positioned in a vicinity of a geographical point for storing said user inputted information about said geographical point wherein at least one access right level is applied to at least portions of said user inputted information; and retrieval means responsive to a retrieval request, including positioning information and access right information, initiated by a second mobile terminal user positioned in a vicinity of said geographical point for retrieving at least a portion of said user inputted information along with the location information concerning said geographical point corresponding to an access right level of said second mobile terminal requesting said information; and wherein the location information including at least a portion of said user inputted information is provided to said second mobile terminal user by way of at least one web link.

2. A collaborative location server according to claim 1, wherein said positioning information included in each of said storage and retrieval requests transmitted by said first and second mobile terminals is supplied by a positioning system.

3. A collaborative location server according to claim 1, wherein said location information for each geographical point includes position information of said geographical point including geographical coordinates, identification (ID) information of said geographical point including a name, title information of said location information including a title of said location information, type information of said geographical point including information concerning a type of said geographical point, owner information of said location information including information of an owner of said location information, said access right information of said location information including information of access rights of users to said location information, comment information including comments of a creator of said location information, link information including information for linking said location information to other information, and date information including a time and date of creation of said location information and expiration date of said location information.

4. A collaborative location server according to claim 3, wherein said link information includes information for linking said location information to at least one web page stored on said collaborative location server or on a web server on a network accessible to said collaborative location server.

5. A collaborative location server according to claim 3, wherein any information included in said location information includes link information for linking said location information to other information.

6. A collaborative location server according to claim 1, wherein the location information is a virtual electronic document providing information concerning a corresponding geographical point.

7. A collaborative location server according to claim 6, wherein each virtual electronic document is a web page.

8. A collaborative location server according to claim 7, wherein said web page is linked to other web pages providing information about other location information.

9. A collaborative location server according to claim 7, wherein said web page is linked to other web pages stored on said collaborative location server or on a web server on a network accessible to said collaborative location server.

10. A collaborative location server according to claim 1, wherein the location information stored by the first user of a mobile terminal is retrieved by the second user of a mobile terminal.

11. A method using a network of storing, retrieving and publishing information input by a plurality of users of mobile terminals with respect to geographical points comprising the steps of:
   storing location information including user inputted information in a storage, operatively connected to the network, in corresponding relation to each of a plurality of geographical points,
   wherein said location information includes information concerning said geographical points and access right information relating to said user inputted information,
   wherein said user inputted information is stored in said storage along with the location information by mobile terminal users positioned in a vicinity of at least one of the plurality of geographical points for use by other mobile terminal users when positioned in the vicinity of said at least one of the plurality of geographical points;
   in response to a storage request, including positioning information and access right information, initiated by a first mobile terminal user positioned in a vicinity of a geographical point, storing said user inputted information about said geographical point wherein at least one access right level is applied to at least portions of said user inputted information and in response to a retrieval request, including positioning information and access right information, initiated by a second mobile terminal user positioned in a vicinity of said geographical point, retrieving at least a portion of said user inputted information along with the location information concerning said geographical point corresponding to an access right level of said second mobile terminal requesting said information; and
   wherein the location information including at least a portion of said user inputted information is provided to said second mobile terminal user by way of at least one web link.

12. A method according to claim 11, wherein said positioning information included in each of said storage and retrieval requests transmitted by said first mobile terminal user indicates a geographical position of said first mobile terminal.

13. A method according to claim 12, wherein said positioning information included in each of said storage and retrieval requests transmitted by said first mobile terminal is supplied by a positioning system.

14. A method according to claim 11, further comprising the steps of:
   allowing a user of said first mobile terminal to input said positioning information included in each of said storage and retrieval requests transmitted by said first mobile terminal to said second mobile terminal.

15. A method according to claim 11, wherein said location information for each geographical point includes position information of said geographical point including geographical coordinates, identification (ID) information of said geographical point including a name, title information of said location information including a title of said location information, type information of said geographical point including information concerning a type of said geographical point, owner information of said location information including information of an owner of said location information, said access right information of said location information including information defining access rights to said location information, comment information including comments of a creator of said location information, link information including information for linking said location information to other information, and date information including a time and date of creation of said location information and expiration date of said location information.

16. A method according to claim 15, wherein information included in said location information includes link information for linking said location information to other information.

17. A method according to claim 16, wherein said link information links said location information to at least one web page stored on said collaborative location server or on a web server on a network accessible to said collaborative location server.

18. A method according to claim 11, wherein the location information is a virtual electronic document providing information concerning a corresponding geographical point.

19. A method according to claim 18, wherein the virtual electronic document is a web page.

20. A method according to claim 19, wherein said web page is linked to other web pages forming other location information.

21. A method according to claim 19, wherein said web page is linked to other web pages stored on said collaborative location server on a web server on a network accessible to said collaborative location server.

22. A collaborative location system operatively connected to a network for storing, retrieving and publishing information input by a plurality of users of mobile terminals with respect to geographical points, comprising:
a plurality of collaborative location servers operatively connected to the network, each storing and retrieving location information input by a plurality of users of mobile terminals with respect to geographical points included within a predefined area, said each collaborative location server comprises:
a storage which stores location information including user inputted information in corresponding relation to each of a plurality of geographical points;
wherein said location information provides information concerning said geographical points and access right information relating to said user inputted information;
wherein said user inputted information is stored in said storage along with the location information by mobile terminal users positioned in a vicinity of at least one of the plurality of geographical points for use by other mobile terminal users when positioned in the vicinity of said at least one of the plurality of geographical points;
storage and retrieval means responsive to a storage request, including positioning information and access right information, initiated by a first mobile terminal user positioned in a vicinity of a geographical point for storing said user inputted information about said first geographical point wherein at least one access right level is applied to at least portions of said user inputted information and a retrieval request, including positioning information and access right information, initiated by a mobile terminal user positioned in a vicinity of said geographical point for retrieving at least a portion of said user inputted information along with the location information concerning said geographical point corresponding to an access right level of a second mobile terminal requesting said information; and
wherein the location information including at least a portion of said user inputted information is provided to said second mobile terminal user by way of at last one web link.

23. A collaborative location system according to claim 22, wherein said positioning information included in each of said storage and retrieval requests transmitted by said first and second mobile terminals indicates a geographical position of said first and second mobile terminals.

24. A collaborative location system according to claim 23, wherein said positioning information included in each of said storage and retrieval requests transmitted by said first and second mobile terminals is supplied by a positioning system.

25. A collaborative location system according to claim 22, wherein said positioning information included in each of said storage and retrieval requests transmitted by said fist and second mobile terminals is input by a user thereof.

26. A collaborative location system according to claim 22, wherein said location information for each geographical point includes position information of said geographical point including geographical coordinates, identification (ID) information of said geographical point including a name, title information of said location information including a title of said location information, type information of said geographical point including information concerning a type of said geographical point, owner information of said location information including information of an owner of said location information, said access right information of said location information including information of access rights of users to said location information, comment information including comments of a creator of said location information, link information including information for linking said location information to other information, and date information including a time and date of creation of said location information and expiration date of said location information.

27. A collaborative location system according to claim 26, wherein any of information included in said location information includes link information for linking said location information to other information.

28. A collaborative location system according to claim 27, wherein said link information links said location information to at least one web page stored on said collaborative location server or on a web server on a network accessible to said collaborative location server.

29. A collaborative location system according to claim 22, wherein the location information is a virtual electronic document providing information concerning a corresponding geographical point.

30. A collaborative location system according to claim 29, wherein each virtual electronic document is a web page.

31. A collaborative location system according to claim 30, wherein said web page is linked to other web pages forming information about other location information.

32. A collaborative location system according to claim 30, wherein said web page is linked to other web pages stored on said collaborative location server or on a web server on a network accessible to said collaborative location server.

* * * * *